US012234962B2

(12) United States Patent
Mazuir et al.

(10) Patent No.: US 12,234,962 B2
(45) **Date of Patent: *Feb. 25, 2025**

(54) SYSTEMS WITH ADJUSTABLE LIGHTS

(71) Applicant: Apple Inc., Cupertino, CA (US)

(72) Inventors: Clarisse Mazuir, San Jose, CA (US); Christopher P Child, San Jose, CA (US); Xiaofeng Tang, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,304

(22) Filed: May 22, 2023

(65) Prior Publication Data

US 2023/0288040 A1 Sep. 14, 2023

Related U.S. Application Data

(63) Continuation of application No. 17/825,495, filed on May 26, 2022, now Pat. No. 11,713,859.

(60) Provisional application No. 63/220,918, filed on Jul. 12, 2021.

(51) Int. Cl.

| | |
|---|---|
| ***F21S 41/63*** | (2018.01) |
| ***F21S 41/143*** | (2018.01) |
| ***F21S 41/25*** | (2018.01) |
| ***F21S 41/29*** | (2018.01) |
| ***F21S 41/64*** | (2018.01) |
| *F21Y 113/10* | (2016.01) |

(52) U.S. Cl.
CPC ........... *F21S 41/635* (2018.01); *F21S 41/143* (2018.01); *F21S 41/25* (2018.01); *F21S 41/29* (2018.01); *F21S 41/645* (2018.01); *F21Y 2113/10* (2016.08)

(58) Field of Classification Search
CPC ........ F21S 41/635; F21S 41/143; F21S 41/25; F21S 41/29; F21S 41/645; F21Y 2113/10
See application file for complete search history.

(56) References Cited

U.S. PATENT DOCUMENTS

| | | | |
|---|---|---|---|
| 8,801,242 | B2 | 8/2014 | Hamm et al. |
| 10,112,528 | B1 | 10/2018 | Mazuir et al. |
| 10,317,037 | B2 | 6/2019 | Godbillon et al. |

(Continued)

FOREIGN PATENT DOCUMENTS

| | | | |
|---|---|---|---|
| DE | 102018008760 | A1 | 4/2019 |
| EP | 1442927 | A1 | 8/2004 |

(Continued)

*Primary Examiner* — Elmito Breval
(74) *Attorney, Agent, or Firm* — Treyz Law Group, P.C.; G. Victor Treyz; David K. Cole

(57) ABSTRACT

A system may have lights for providing illumination. The lights may be electrically adjustable so that the color and pattern of the illumination may be varied. Sensor data and/or other data may be used in determining how to adjust the lights. A light may have a light source such as a white light source or multicolored light source, a light collimator that receives light from the light source, and an adjustable lens array that receives collimated light from the light collimator and outputs corresponding adjustable vehicle illumination. The adjustable lens array may have fixed and/or adjustable lens elements and corresponding electrically adjustable light modulator elements.

20 Claims, 6 Drawing Sheets

(56) References Cited

U.S. PATENT DOCUMENTS

| | | | |
|---|---|---|---|
| 10,518,695 B2 | 12/2019 | Taudt et al. | |
| 10,724,699 B2 | 7/2020 | Zhang et al. | |
| 10,752,162 B2 | 8/2020 | Gutjahr et al. | |
| 10,900,630 B2 | 1/2021 | Dikau et al. | |
| 2009/0279316 A1 | 11/2009 | Hikmet et al. | |
| 2018/0245759 A1 | 8/2018 | Plank et al. | |
| 2020/0004020 A1* | 1/2020 | Bhakta | G02B 27/30 |
| 2020/0393105 A1 | 12/2020 | Lin | |

FOREIGN PATENT DOCUMENTS

| | | | |
|---|---|---|---|
| EP | 3486555 | A1 | 5/2019 |
| JP | 2009534790 | A | 9/2009 |
| JP | 2020061231 | A | 4/2020 |
| JP | 2021504926 | A | 2/2021 |
| WO | 2014164792 | A1 | 10/2014 |
| WO | 2015058227 | A1 | 4/2015 |
| WO | 2017066818 | A1 | 4/2017 |
| WO | 2020039964 | A1 | 2/2020 |
| WO | 2020071413 | A1 | 4/2020 |

* cited by examiner

SYSTEMS WITH ADJUSTABLE LIGHTS

This application is a continuation of patent application Ser. No. 17/825,495, filed May 26, 2022, which claims the benefit of provisional patent application No. 63/220,918, filed Jul. 12, 2021, which are hereby incorporated by reference herein in their entireties.

FIELD

This relates generally to systems such as vehicles, and, more particularly, vehicles that have lights.

BACKGROUND

Automobiles and other vehicles have lights such as headlights. To accommodate different driving conditions, headlights are sometimes provided with adjustable settings such as low beam and high beam settings.

SUMMARY

A vehicle may have lights such as headlights and other vehicle lights for providing vehicle illumination. The lights may be electrically adjustable so that the color and pattern of the illumination may be varied. Control circuitry in a vehicle may adjust the lights based on sensor data, user input, and other criteria.

A light such as headlight may have a light source such as a white light source or multicolored light source, a light collimator that receives light from the light source, and an adjustable lens array that receives collimated light from the light collimator and outputs corresponding adjustable vehicle illumination.

The adjustable lens array may have first and second arrays of lens elements that are aligned with each other. The adjustable lens array may have an electrically adjustable light modulator located between the first and second lens element arrays. A mask may have openings aligned with respective adjustable light modulator elements in the adjustable light modulator.

The first array of lens elements may receive collimated light from the light collimator. Each of the first lens elements may focus light through a respective opening in the mask and through a corresponding one of the adjustable light modulator elements. Light exiting each adjustable light modulator element may be collimated to form parallel or nearly parallel output light rays.

During operation, the light modulator elements in the adjustable lens array may be individually adjusted and the light source may be adjusted. This allows the light to create output illumination with a desired beam pattern and color. The output illumination may serve as headlight illumination or other vehicle illumination.

DETAILED DESCRIPTION

A system such as a vehicle or other system may have components that emit light such as headlights and other lights. Headlights may be used to illuminate roadways and other objects in the vicinity of a vehicle. The illumination provided by the headlights allows vehicle occupants to view the objects at night or in other dim ambient lighting conditions and facilitates the operation of sensors. For example, headlight illumination at visible and/or infrared wavelengths may be used to provide illumination for image sensors that are used by an autonomous driving system or driver's assistance system.

The illumination that is emitted by the headlights may be adjusted. For example, the headlights may have adjustable lens arrays and other adjustable components that allow the pattern of illumination emitted by the headlights to be adjusted. Headlights may, as an example, be adjusted to narrow or widen headlight beams and/or to otherwise adjust the shape of the headlight illumination pattern. If desired, the color of emitted light may be varied. Headlight beam adjustments may be used to switch the headlights between operation in high-beam and low-beam modes, to steer headlight beams to the left and right (e.g., to accommodate curves in a road), to spotlight objects of interest, to enhance headlight performance under particular weather conditions or other operating conditions, to provide alerts to pedestrians or others, and/or to otherwise vary the properties of the headlight output.

Figure 1:
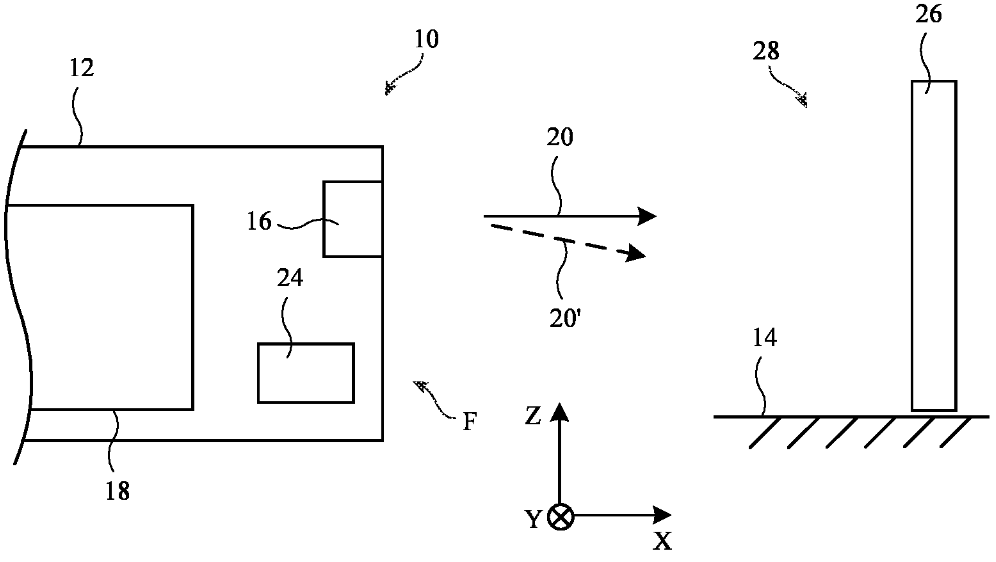
FIG. 1 is a side view of an illustrative vehicle and structures in front of the vehicle in accordance with an embodiment.

FIG. 1 is a side view of a portion of an illustrative vehicle. In the example of FIG. 1, vehicle 10 is the type of vehicle that may carry passengers (e.g., an automobile, truck, or other automotive vehicle). Configurations in which vehicle 10 is a robot (e.g., an autonomous robot) or other vehicle that does not carry human passengers may also be used. Vehicles such as automobiles may sometimes be described herein as an example. As shown in FIG. 1, vehicle 10 may be operated on roads such as roadway 14. Objects such as object 26 may be located on or near other structures in the vicinity of vehicle 10 such as roadway 14.

Vehicle 10 may be manually driven (e.g., by a human driver), may be operated via remote control, and/or may be autonomously operated (e.g., by an autonomous driving system or other autonomous propulsion system). Using vehicle sensors such as lidar, radar, visible and/or infrared cameras (e.g., two-dimensional and/or three-dimensional cameras), proximity (distance) sensors, and/or other sensors, an autonomous driving system and/or driver-assistance system in vehicle 10 may perform automatic braking, steering, and/or other operations to help avoid pedestrians, inanimate objects, and/or other external structures such as illustrative obstacle 26 on roadway 14.

Vehicle 10 may include a body such as vehicle body 12. Body 12 may include vehicle structures such as body panels formed from metal and/or other materials, may include doors 18, a hood, a trunk, fenders, a chassis to which wheels are mounted, a roof, etc. Windows may be formed in doors 18 and other portions of vehicle body 12 (e.g., on the sides of vehicle body 12, on the roof of vehicle 10, and/or in other portions of vehicle 10). Windows, doors 18, and other portions of body 12 may separate the interior of vehicle 10 from the exterior environment that is surrounding vehicle 10. Doors 18 may be opened and closed to allow people to enter and exit vehicle 10. Seats and other structures may be formed in the interior of vehicle body 12.

Vehicle 10 may have automotive lighting such as one or more headlights (sometimes referred to as headlamps), driving lights, fog lights, daytime running lights, turn signals, brake lights, and/or other lights. As shown in FIG. 1, for example, vehicle 10 may have lights such as lights 16. In general, lights 16 may be mounted on front F of vehicle 10, on an opposing rear portion of vehicle 10, on the left and/or right sides of vehicle 10, and/or on other portions of body 12. In an illustrative configuration, which may sometimes be described herein as an example, lights 16 are headlights and are mounted to front F of body 12. There may be, as an example, left and right headlights 16 located respectively on the left and right of vehicle 10 to provide illumination 20 in the forward direction (e.g., in the +X direction in which vehicle 10 moves when driven forward in the example of FIG. 1). By shining headlights 16 on external surfaces 28 such as roadway 14 and object 26 in front of vehicle 10, occupants of vehicle 10 may view surfaces 28 even in dim ambient lighting conditions (e.g., at night or in other low-light situations due to weather, tunnels, time of day, etc.). The operation of sensors in vehicle 10 such as image sensors and other sensors that use light may also be supported by providing surfaces 28 with illumination.

If desired, headlights or other vehicle lights may be used to assist a user of vehicle 10 who is approaching vehicle 10 and/or may be used to communicate with pedestrians or others nearby. As an example, headlights or other vehicle lights may be used to light up the area around vehicle 10 with illumination 20 whenever sensors in vehicle 10 detect that a user is approaching vehicle 10. In this way, a user may be able to better view obstacles near the vehicle and can walk around such obstacles. As another example, pedestrians may be waiting to cross in front of vehicle 10 after vehicle 10 has come to a stop at a crosswalk. To help inform the pedestrians that it is safe to cross, vehicle 10 may adjust headlights or other vehicle lights to illuminate the crosswalk. A given color of light (e.g., green light for safe crossing conditions or a red light otherwise), a particular pattern of light (e.g., an arrow orientated along the crosswalk or a stop sign), time-varying light characteristics (e.g., slow flashing at 1 Hz, a chasing light pattern, etc.), and/or any other suitable aspect of illumination 20 may be used to inform the pedestrians when it is safe to cross the street and/or to otherwise provide information to people in the vicinity of vehicle 10.

Vehicle 10 may have components 24. Components 24 may include propulsion and steering systems (e.g., manually adjustable driving systems and/or autonomous driving systems having wheels coupled to body 12, steering controls, one or more motors for driving the wheels, etc.), and other vehicle systems. Components 24 may include control circuitry and input-output devices. Control circuitry in components 24 may be configured to run an autonomous driving application, a navigation application (e.g., an application for displaying maps on a display), and software for controlling vehicle climate control devices, lighting, media playback, window movement, door operations, sensor operations, and/or other vehicle operations. For example, the control system may form part of an autonomous driving system that drives vehicle 10 on roadways such as roadway 14 autonomously using data such as sensor data. The control circuitry may include processing circuitry and storage and may be configured to perform operations in vehicle 10 using hardware (e.g., dedicated hardware or circuitry), firmware and/or software. Software code for performing operations in vehicle 10 and other data is stored on non-transitory computer readable storage media (e.g., tangible computer readable storage media) in the control circuitry. The software code may sometimes be referred to as software, data, program instructions, computer instructions, instructions, or code. The non-transitory computer readable storage media may include non-volatile memory such as non-volatile random-access memory, one or more hard drives (e.g., magnetic drives or solid-state drives), one or more removable flash drives or other removable media, or other storage. Software stored on the non-transitory computer readable storage media may be executed on the processing circuitry of components 24. The processing circuitry may include application-specific integrated circuits with processing circuitry, one or more microprocessors, a central processing unit (CPU) or other processing circuitry.

The input-output devices of components 24 may include displays, light-emitting diodes and other light-emitting devices, haptic devices, speakers, and/or other devices for providing output. Output devices in components 24 may, for example, be used to provide vehicle occupants and others with haptic output, audio output, visual output (e.g., displayed content, light, etc.), and/or other suitable output. The input-output devices of components 24 may also include input devices such as buttons, sensors, and other devices for gathering user input, for gathering environmental measurements, for gathering information on vehicle operations, and/or for gathering other information. The sensors in components 24 may include ambient light sensors, touch sensors, force sensors, proximity sensors, optical sensors such as cameras operating at visible, infrared, and/or ultraviolet wavelengths (e.g., fisheye cameras, two-dimensional cameras, three-dimensional cameras, and/or other cameras), capacitive sensors, resistive sensors, ultrasonic sensors (e.g., ultrasonic distance sensors), microphones, radio-frequency sensors such as radar sensors, lidar (light detection and ranging) sensors, door open/close sensors, seat pressure sensors and other vehicle occupant sensors, window sensors, position sensors for monitoring location, orientation, and movement, speedometers, satellite positioning system sensors, and/or other sensors.

During operation, the control circuitry of components 24 may gather information from sensors and/or other input-output devices such as lidar data, camera data (e.g., two-dimensional images), radar data, and/or other sensor data. This information may be used by an autonomous driving system and/or driver's assistance system in vehicle 10. This information may also be used in determining the shape of roadway 14, the location of objects such as objects 26 and/or other characteristics of surfaces 28. Based on these measurements, user input, or other information, vehicle 10 may adjust headlights 16. For example, beam shape may be adjusted when oncoming headlights are detected, beam direction may be adjusted to accommodate detected curves in roadway 14, beam shape may be adjusted to help enhance visibility in rain or other weather conditions, beam shape may be adjusted to spotlight detected objects such as object 26, suitable patterns and/or colors of illumination may be output when it is desired to use headlights 16 and/or other vehicle lighting to provide output to nearby pedestrians or others, output light may be adjusted to provide illumination near vehicle 10 as a user walks towards vehicle 10 at night, etc.

A vehicle occupant or other user of vehicle 10 may provide user input to the control circuitry of vehicle 10. Cameras, touch sensors, physical controls, and other input devices may be used to gather the user input. Using wireless communications with vehicle 10, remote data sources may provide the control circuitry of components 24 with database information. If desired, headlights 16 and/or other vehicle lighting may be adjusted based on user input and/or information from a remote data source. For example, information on road conditions (e.g., road size, road type, road shape, road surface, etc.) may be stored in a remote database and this information may be provided to vehicle 10 over a wireless communications link. During operation, vehicle 10 may adjust headlights 16 based on the road condition information.

Headlights 16 may have two-dimensional arrays of components. Headlights 16 may, for example, have arrays of light-emitting diodes and/or other light sources and corresponding arrays of lenses (sometimes referred to as microlens arrays or lens arrays) that control the directions in which light is emitted from the headlights. Headlights 16 may also have light modulator arrays (e.g., arrays of individually adjustable light modulator elements that adjust the amount of light passing through corresponding lenses). If desired, lens elements may be formed from liquid crystal material and/or other material having optical properties (e.g., electrically adjustable refractive index values) that can be adjusted to change lens element focal lengths and/or other lens element optical characteristics.

The arrays of components in headlights 16 may be arranged to form two-dimensional arrays with rows and columns or may be arranged with other two-dimensional layouts. Array components such as lenses and/or light modulator elements may have rectangular outlines or other suitable shapes (e.g., hexagonal footprints, etc.). In an illustrative configuration, which may sometimes be described herein as an example, lens and light modulator elements have rectangular shapes and are arranged in rows and columns in a two-dimensional array (e.g., an N×M array, where the values of N and/or M are at least 2, at least 5, at least 10, less than 50, less than 20, less than 15, and/or less than 10).

Figure 2:
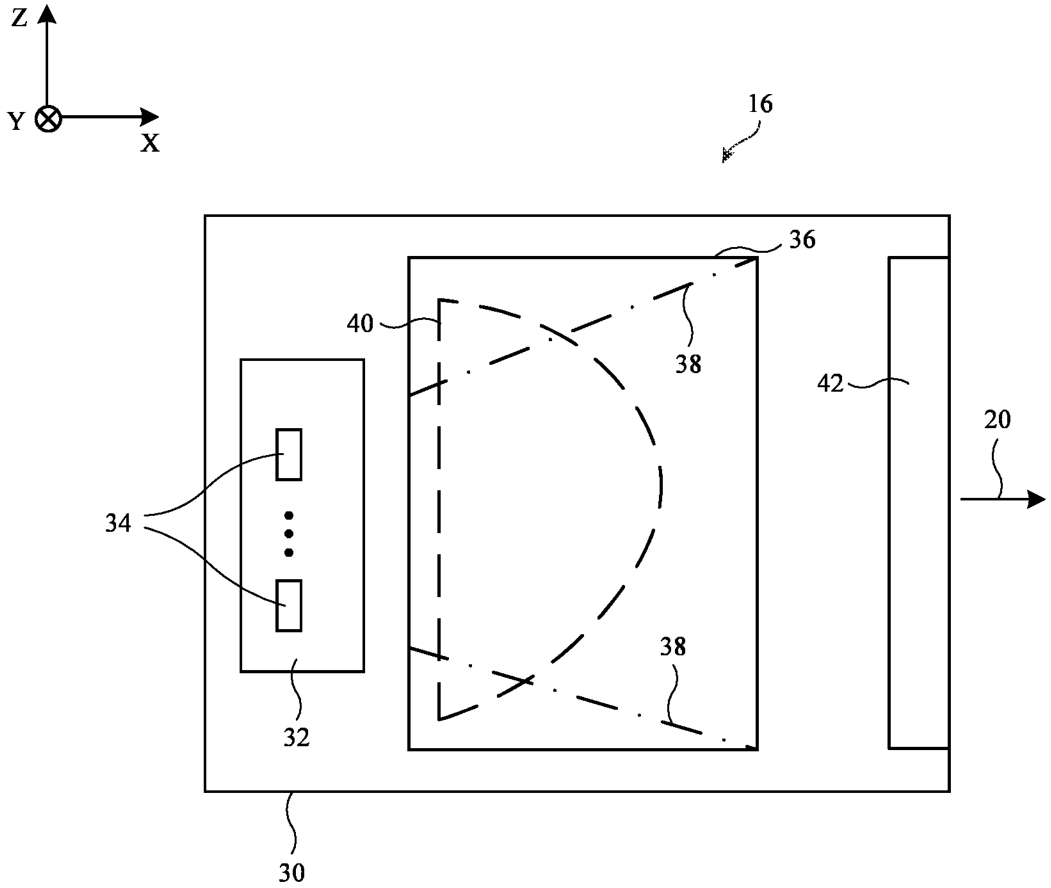
FIG. 2 is a cross-sectional side view of an illustrative vehicle light in accordance with an embodiment.

FIG. 2 is a cross-sectional side view of an illustrative headlight for vehicle 10. Headlight 16 of FIG. 2 may be mounted to body 12. Body 12 may have a cavity that receives headlight 16, headlight 16 may be attached to an outer surface of body 12, and/or headlight 16 may be otherwise supported by body 12. As shown in FIG. 2, headlight 16 may include headlight housing 30. Light may be produced by light source 32. Light source 32 may have multiple light-emitting devices 34 such as light-emitting diodes, lasers, lamps, etc. Light-emitting devices 34 may, as an example, be light-emitting diodes such as white light-emitting diodes. If desired, light-emitting devices 34 may include infrared light-emitting diodes that are configured to emit infrared light, may include colored light-emitting diodes (e.g., red, yellow, blue, and/or green light-emitting diodes), and/or may include other light-emitting components. In arrangements in which source 32 includes devices 34 of different colors, light color may be adjusted by selectively activating and deactivating devices 34.

Light source 32 may emit light that travels in the +X direction of FIG. 2 in the interior of housing 30. Headlight 16 may include a light concentrating component such as light collimator 36 that helps collimate the light emitted by light source 32. Light collimator 36 may be formed from one or more optical components such as illustrative collimating lens 40 and/or a reflective structure that helps concentrate light from light source 32 such as conical mirror 38. Light from light source 32 that has been partly or fully collimated by light collimator 36 passes through adjustable lens array 42 before being emitted as headlight illumination 20 (e.g., a headlight beam that can produce illumination on surfaces 28).

Figure 3:
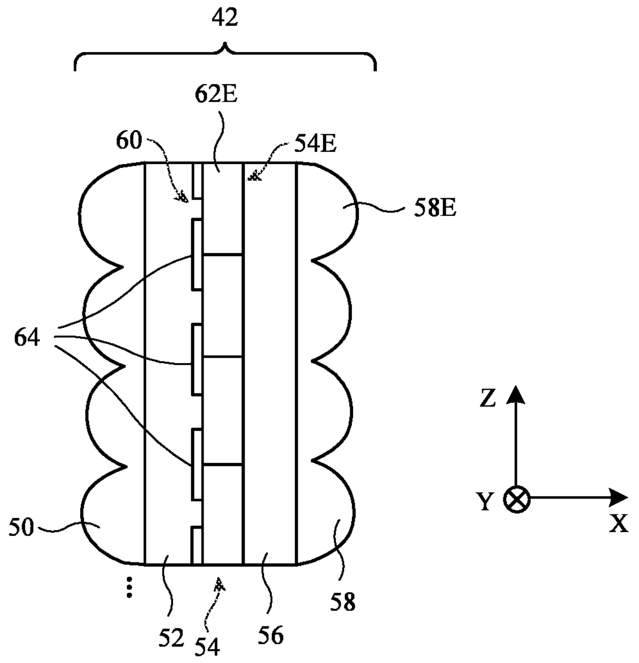
FIG. 3 is a cross-sectional side view of an illustrative adjustable lens array for a vehicle light in accordance with an embodiment.

FIG. 3 is a cross-sectional side view of an illustrative adjustable lens array for headlight 16. As shown in FIG. 3, adjustable lens array 42 may have one or more arrays of lens elements such as lens array 50 and lens array 58. The lenses of arrays 50 and 58 may be organized in rows and columns or other suitable patterns (e.g., columns extending parallel to the Z axis and rows extending parallel to the Y axis in the example of FIG. 3). Each lens of array 50 may be aligned with a respective lens of array 58.

An array of light modulator elements such as light modulator array 54 may be interposed between lens array 50 and lens array 58. Array 54 may be separated from lens arrays 50 and 58 by air gaps or gaps 52 and/or 56 between light modulator array 54 and array 50 and/or array 58 may be filled with clear polymer or other transparent material. Light modulator array 54 may have an array of electrically adjustable light modulators elements 54E, which may be individually controlled (e.g., elements 54E may be arranged in a two-dimensional array having columns parallel to the Z axis of FIG. 3 and having rows parallel to the Y axis of FIG. 3). By adjusting the amount of light passing through each light modulator element 54E, the pattern of light passing through lens array 42 can be controlled to adjust the headlight beam pattern emitted by headlight 16.

If desired, array 54 may be provided with a masking grid. For example, each element 54E may have a light modulator cell 62E covered by a portion of an opaque mask 64. Mask 64 may be configured so that there is a mask opening 60 that is aligned with the center of each light modulator cell 62E. Mask 64 may help block stray light and thereby reduce or eliminate light rays passing through structures at the boundaries between adjacent cells 62E and may therefore help ensure that the light passing through each light modulator element 54E is passing through a desired active area of that element. Masks such as mask 64 may be provided on the entrance face and/or exit face of array 54 and/or may otherwise be incorporated into array 54.

Figure 4:
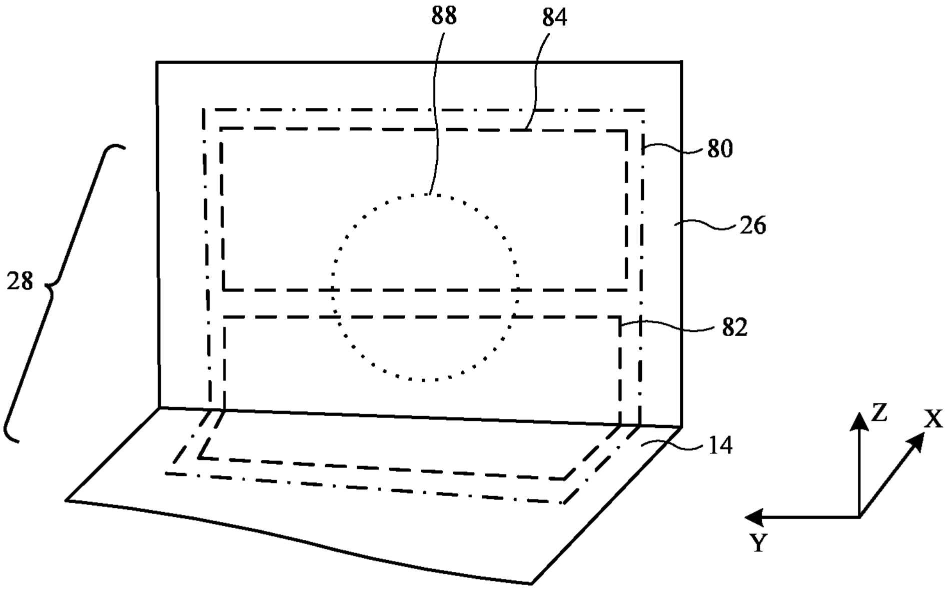
FIG. 4 is a diagram of an illustrative surface illuminated with an adjustable vehicle light in accordance with an embodiment.

Vehicle 10 may use sensor input, user input, or other information in determining how to adjust array 42. Consider, as an example, the arrangement of FIG. 4. As shown in FIG. 4, headlight 16 may illuminate surfaces 28 in front of vehicle 10, such as the surface of object 26 and/or the surface of roadway 14. During operation of vehicle 10 (e.g., while vehicle 10 is being driven along roadway 14), vehicle 10 may determine that the output of headlight 16 should be provided in a high-beam mode and may therefore adjust array 42 to produce illumination in high-beam pattern 80. In other conditions such as when oncoming headlights are detected or rain is sensed, vehicle 10 may determine that the output of headlight 16 should be provide in a low-beam mode and may therefore adjust array 42 to produce illumination in low-beam pattern 82. In other situations, the beam output by headlight 16 may be adjusted to have a pattern such as illustrative pattern 84, illustrative pattern 88, and/or any other suitable pattern that illuminates a desired portion or portions (e.g., discontinuous portions) of the surface in the vicinity of vehicle 10. Patterns such as these may assist a user in viewing objects of interest (e.g., by highlighting the object with spot illumination) and may be used in assisting the user in difficult lighting conditions (e.g., illumination attributes may be adjusted to enhance roadway and obstacle visibility by angling illumination 20 downwardly, by adjusting the color of illumination 20, and by increasing the intensity of illumination 20 during inclement weather where beam direction, intensity, color, and/or other factors tend to reduce visibility). If desired, headlights 16 may be adjusted to provide pedestrians and others in the vicinity of vehicle 10 with information on vehicle status, planned vehicle operations, and/or other vehicle attributes. As an example, illumination 20 may be red and flashing and may be provided in pattern 84 or 80 to inform people near vehicle 10 that vehicle 10 is moving or is about to move. In general, the illumination from headlight 16 may be controlled to have any suitable shape (circular, oval, rectangular, etc.) and may be steered up/down and/or left/right. If desired, the pattern of light that is emitted may convey information to nearby observers. For example, a particular type of illumination (e.g., vertical or horizontal stripes, spots, icon shapes, and/or other patterns of illumination, illumination of a given color, and/or illumination characterized by a given time-varying intensity) may serve as an indicator that vehicle 10 is about to turn, slow down, stop, or accelerate, may serve as an indicator that a pedestrian or other person has been recognized by vehicle 10, may serve as an indicator that vehicle 10 is driving autonomously or manually, and/or may serve as an indicator that other conditions are present, etc.

Figure 5:
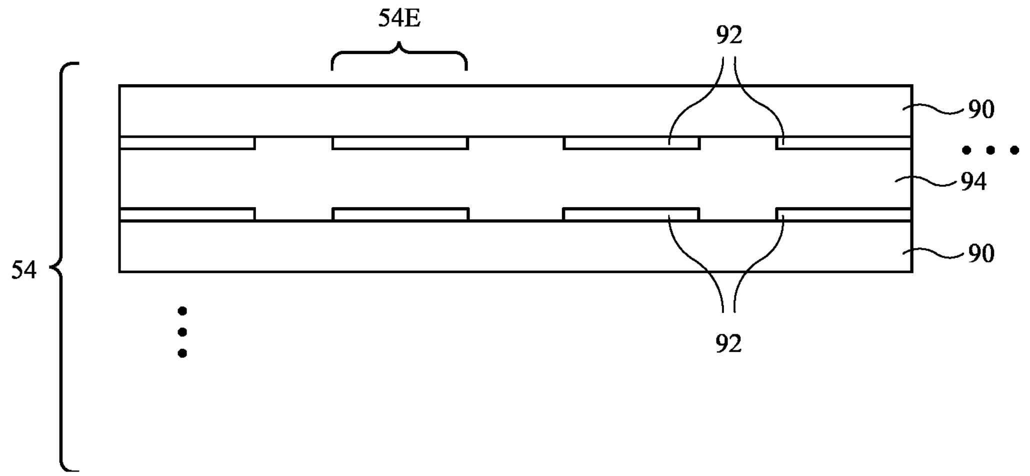
FIG. 5 is a cross-sectional side view of an illustrative light modulator array based on a guest-host liquid crystal layer in accordance with an embodiment.
Figure 6:
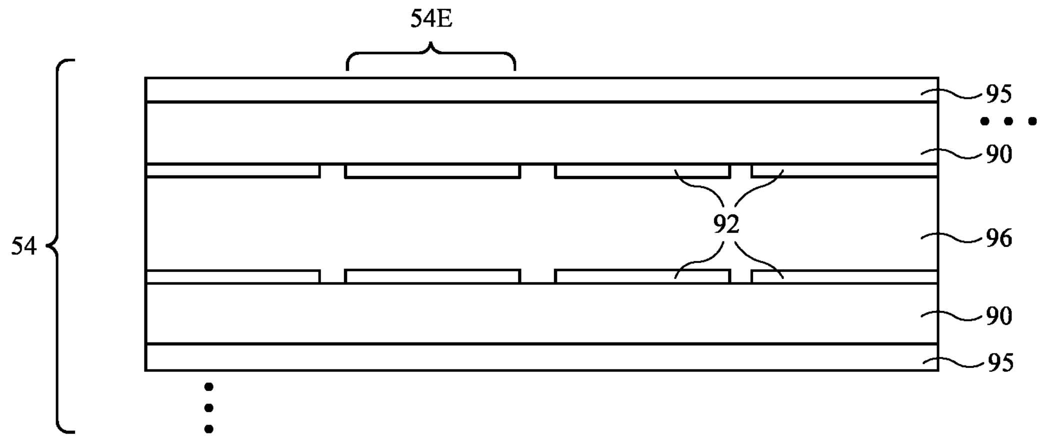
FIG. 6 is a cross-sectional side view of an illustrative liquid crystal light modulator array in accordance with an embodiment.
Figure 7:
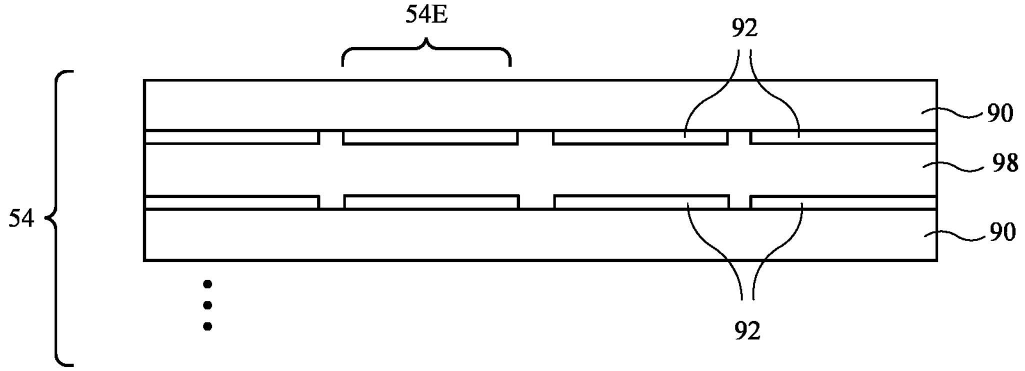
FIG. 7 is a cross-sectional side view of an illustrative electrochromic light modulator array in accordance with an embodiment.

FIGS. 5, 6, and 7 are cross-sectional side views of illustrative light modulator arrays for adjustable lens array 42.

In the example of FIG. 5, light modulator array 54 has an array of individually adjustable light modulator elements 54E based on guest-host liquid crystal modulator devices. Array 54 may, as an example, have first and second transparent substrates 90 with respective sets of transparent light modulator electrodes 92 (e.g., electrodes formed from transparent conductive material such as indium tin oxide, etc.). Each element 54E in the example of FIG. 5 has first and second respective electrodes. If desired, a shared ground electrode may span multiple elements 54E. The arrangements of FIGS. 5, 6, and 7 where a pair of element-specific electrodes is used for each element 54E are illustrative.

As shown in FIG. 5, guest-host liquid crystal layer 94 may be interposed between substrates 90. By supplying a desired (and potentially different) voltage to the electrodes 92 of each element 54E, the magnitude of the electric field across guest-host liquid crystal layer 94 may be adjusted as a function of position within array 54 (e.g., the amount of light transmission may be independently varied as desired for each light modulator element 54E). Each element 54E may, as an example, be placed in an opaque state, a transparent state, or one or more intermediate transmission states in which the element is characterized by an intermediate amount of light transmission between the opaque and transparent state levels. By adjusting each of the light modulator elements 54E in array 54 in this way, the amount of light output from each element 54E may be adjusted so that the pattern of light emitted by headlight 16 is controlled as described in connection with the examples of FIG. 4.

In one illustrative configuration, guest-host liquid crystal layer 94 has black absorbing dyes so that elements 54E exhibit neutral transmission. Elements 54E may, for example, appear clear, gray, or black, allowing headlight illumination 20 to appear neutral in color with no color cast when light source 32 emits white light illumination. The transmission dynamic range of array 54 may, as an example, be 1:20 and array 54 may have a response time on the order of milliseconds.

In other illustrative configurations, there are multiple guest-host liquid crystal layers and associated substrates in array 54. For example, multiple guest-host liquid crystal light modulator structures may be stacked on top of each other to form array 54. Each guest-host liquid crystal light modulator layer in this type of stacked configuration may have a dichroic dye or other guest material that is configured to pass light of a different color. For example, a first layer may have an array of red guest-host liquid crystal light modulator elements that pass a selected amount of red light, a second layer may have an array of green guest-host liquid crystal light modulator elements that pass a selected amount of green light, and a third layer may have an array of blue guest-host liquid crystal light modulator elements that pass a selected amount of blue light.

During operation, white light illumination from light source 32 that has passed through light collimator 36 may be supplied to this stacked structure. A masking layer with an array of openings such as mask 64 of FIG. 3 may be associated with each stacked structure (layer). The openings in each mask and the layout of the elements 54E in each corresponding layer of the stacked structure may be configured to avoid interference between layers. As an example, the green and blue layers may have openings that permit red light from the red layer to pass after this light has been adjusted in intensity by the red-light modulator elements and the red layer may have openings that permit white light to reach the green and blue light modulator elements in their respective layers.

Depending on the settings of the red, green, and blue light modulator elements in the stack of array 54, desired patterns of red, green, and blue light may be emitted from headlight 16. The red, green, and blue light may merge when projected onto surface 28, so that the relative intensity contributed by each color will influence the resulting color of the headlight illumination. By mixing the emitted red, green, and blue light, different non-neutral colors of headlight beams may be created and/or different portions of headlight beams may be provided with different colors. Colored light may also be mixed where there is overlap between the output of different array elements, thereby forming mixed-color areas and/or white light areas.

If desired, light source 32 may have multiple light-emitting devices 34 of different colors. Light source 32 may include, for example, red, green, and blue light-emitting diodes or other non-neutrally colored light-emitting devices. In this type of arrangement, a single layer of light modulator elements 54E may be used to provide colored output for headlight 16. Red light, green light, and blue light may be provided in a series of discrete pulse (e.g., pulses of less than $1/60$ s or other short time period to avoid visible flicker effects). Light modulator array 54 may be configured to pass a first pattern of light when the red-light source is active, a second pattern of light when the green light is active, and a third pattern of light when the blue light is active. In this way, headlight beams with desired patterns and colors may be created. As an example, if red light output is desired, the blue and green light sources may be turned off and if white light output is desired, the red, blue, and green sources may all be activated. These types of arrangements and/or other arrangements may be used for providing headlight 16 with the ability to produce colored light illumination regardless of the type of light modulator elements 54E that are used. If desired, light source 32 may include one or more infrared light-emitting devices 34. This allows desired patterns of infrared light to be emitted (e.g., the light-modulator elements of array 54 may be used to modify the pattern of emitted infrared light in addition to modifying the patterns of emitted red, blue, and green light).

Color may be imparted to white light passing through array 54 using colored dyes in guest-host liquid crystal layers or may be provided using other color filter arrangements. For example, in light modulator arrays based on liquid crystal light modulators or electrochromic modulators, color filter structures such as bandpass thin-film interference filters and/or colored ink structures may be used to impart red, green, and blue colors to different layers of modulator elements.

In the example of FIG. 6, light modulator array 54 has an array of light modulator elements 54E based on liquid crystal modulator cells. Substrates 90 of FIG. 6 are sandwiched between polarizers 95. Electrodes 92 may be formed on substrates 90. Liquid crystal layer 96 may be interposed between substrates 90 and between electrodes 92. The voltage applied to the pair of electrodes 92 in each element 54E controls the amount of electric field applied across the portion of liquid crystal layer 96 associated with that elements 54E. In turn, the amount of electric field in the liquid crystal layer of each element 54E controls the amount of liquid crystal molecule rotation in that element, the corresponding amount of light polarization rotation exhibited by that element, and therefore the amount of light transmission through that element. The transmission dynamic range in this type of light modulator array may be, as an example, 1:200. Response times may be on the order of milliseconds or faster. If desired, two or more liquid crystal light modulator structures (e.g., two or more liquid crystal layers 96 and associated substrates 90, polarizers 95, and electrodes 92) may be stacked on top of each other as descried in connection with the illustrative stacked modulator arrangement of FIG. 5. Each stacked structure may have a respective mask 64 or a single mask may be shared among layers in the stack.

An illustrative electrochromic light modulator array is shown in FIG. 7. Electrochromic light modulator array 54 of FIG. 7 has an array of electrochromic light modulator elements 54E. Array 54 has a layer of electrochromic structures 98 between substrates 90. Electrodes 92 associated with each of elements 54E may be individually supplied with desired voltages to adjust the movement of ions in structures 98. The movement of the ions in each element 54E adjusts the light transmission through that element. The response time of this type of modulator may be about 1 s to several minutes, depending on operating temperature. If desired, two or more electrochromic modulator layers (and associated masks 64) may be stacked to form electrochromic light modulator array 54.

In lens array arrangements of the type shown in FIG. 3, each of the lens elements in input lens array 50 focuses collimated light so that the focused light passes through a corresponding modulator cell 62E (and a corresponding aligned mask opening 60). After passing through element 54E, the light focused by the input lens element is collimated to form parallel or nearly parallel output by a corresponding output lens element in output lens array 58. The lens elements of arrays 50 and 58 may, as examples, be plano-convex lens elements with their planar faces oriented towards each other. Other types of lens shapes may be used, if desired.

In some illustrative configurations, the optical properties of the lenses in lens array 42 may be electrically adjusted. Consider, as an example, adjustable lens elements 100 of the two-dimensional lens array of FIG. 8. Lens elements (lenses) 100 may be formed from liquid crystal material 102 or other material with an electrically adjustable refractive index that is located between first and second transparent substrates 104. By applying electric fields to liquid crystal material 102, the birefringence of material 102 in each lens element 100 may be individually adjusted. A polarizer may be used to polarize light from light source 32 before this light passes through material 102 in each lens element 100, so that the adjustable birefringence results in a desired adjusted value of refractive index for the light passing through that element 100.

Lens elements 100 may be adjusted using signals applied to transparent electrodes 106. The pair of transparent electrodes 106 in each lens element 100 may, for example be supplied with a potentially different desired voltage, thereby controlling the electric field across the liquid crystal material of that lens element 100. In this way, the electric field strength in the liquid crystal material of each lens element 100 adjusts the refractive index of that material and thereby changes the focal length and/or other refractive optical property of that lens. Lens elements 100 may have any suitable shape (e.g., the input and output surfaces of the lenses may include concave and/or convex lens surfaces, may include spherical surfaces, planar surfaces, and/or aspheric surfaces, the lenses may have rectangular outlines, circular outlines, hexagonal outlines, and/or other outlines to allow the lenses to be packed into a desired array, etc.). By adjusting the refractive optical properties of lenses 100 electrically, light can be focused and/or defocused, can be steered, and/or can otherwise be controlled to adjust the pattern of illumination provided by headlight 16 (see, e.g., the adjustable illumination patterns of FIG. 4).

Figure 8:
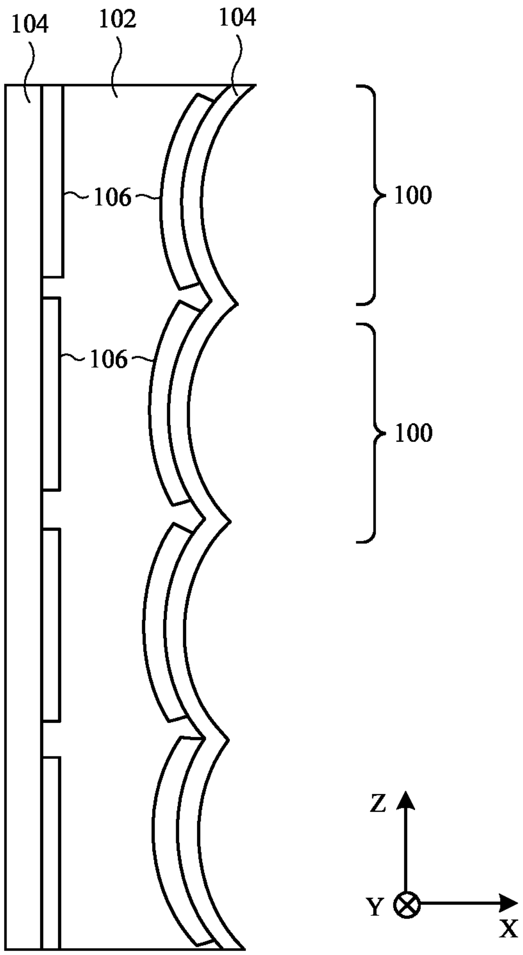
FIG. 8 is a cross-sectional side view of an illustrative lens array having electrically adjustable lens elements in accordance with an embodiment.

The array of adjustable lens elements 100 of FIG. 8 may serve as adjustable lens array 42 (e.g., light modulator array 54 may be omitted from array 42) or the array of adjustable lens elements 100 of FIG. 8 may form a part of adjustable lens array 42. For example, a two-dimensional array of rows and columns of adjustable lens elements 100 may be used in place of lens array 50 and/or lens array 58 of FIG. 3. In this type of configuration, adjustments to the output of headlight 16 may be made by adjusting lenses 100, by adjusting light modulator array 54, and/or by adjusting light source 32.

The foregoing is merely illustrative and various modifications can be made to the described embodiments. The foregoing embodiments may be implemented individually or in any combination.

What is claimed is:

1. A system, comprising:

a body; and a light supported by the body that is configured to produce adjustable illumination, wherein the light comprises:

a light source, and an array of light modulator elements that overlaps the light source, wherein the light source is configured to emit light through the array of light modulator elements, wherein the array of light modulator elements comprises an opaque mask having openings aligned with the light modulator elements.

2. The system of claim 1, wherein the light further comprises a light collimator between the light source and the array of light modulator elements.

3. The system of claim 2, wherein the light collimator collimates the light from the light source before the light from the light source is received by the array of light modulator elements.

4. The system of claim 1, wherein the light further comprises an array of lens elements that overlaps the array of light modulator elements.

5. The system of claim 1, wherein the light source comprises light-emitting devices of different colors that are configured to be pulsed in succession while corresponding adjustments are made to the array of light modulator elements.

6. The system of claim 1, wherein the array of light modulator elements comprises a two-dimensional array of guest-host light modulator elements.

7. The system of claim 1, wherein the array of light modulator elements comprises a two-dimensional array of liquid crystal light modulator elements.

8. The system of claim 1, wherein the array of light modulator elements comprises a two-dimensional array of electrochromic light modulator elements.

9. The system of claim 1, wherein the array of light modulator elements is configured to be adjusted to adjust a size of a beam of the light.

10. The system of claim 1, wherein the array of light modulator elements is configured to be adjusted to adjust a shape of a beam of the light.

11. The system of claim 1, wherein the array of light modulator elements is configured to be adjusted to provide alerts at an exterior of the body.

12. A light configured to output a beam of light, the light comprising:

a light source; and an array of electrically adjustable light modulator elements that overlaps the light source and is configured to be adjusted to adjust the beam of light, wherein the array of electrically adjustable light modulator elements is configured to be adjusted to adjust the beam of light between a high beam and a low beam.

13. The light of claim 12, wherein the array of electrically adjustable light modulator elements is configured to be adjusted to provide an alert.

14. The light of claim 12, wherein the array of electrically adjustable light modulator elements is configured to be adjusted to adjust an illumination pattern of the beam.

15. The light of claim 12, further comprising:

an array of lenses that overlaps the light source; and a collimator between the light source and the array of electrically adjustable light modulator elements.

16. The light of claim 12, further comprising:

a first array of lens elements; and a second array of lens elements, wherein each of the electrically adjustable light modulator elements of the array of electrically adjustable light modulator elements is located between a respective one of the lens elements in the first array of lens elements and a respective one of the lens elements in the second array of lens elements.

17. The light of claim 12, wherein the array of electrically adjustable light modulator elements comprises electrically adjustable light modulator elements selected from the group consisting of: guest-host light modulator elements, liquid crystal light modulator elements, and electrochromic light modulator elements.

18. A light, comprising:

a light source;

an array of electrically adjustable light modulator elements that overlaps the light source, each of which is configured to exhibit an adjustable amount of light transmission for light passing through that electrically adjustable light modulator element;

a first array of lens elements; and a second array of lens elements, wherein each of the electrically adjustable light modulator elements of the array of electrically adjustable light modulator elements is located between a respective one of the lens elements in the first array of lens elements and a respective one of the lens elements in the second array of lens elements.

19. The light of claim 18, wherein the array of electrically adjustable light modulator elements is adjustable to adjust the light passing through the array of electrically adjustable light modulator elements between a high beam mode and a low beam mode.

20. The light of claim 18, wherein the first array of lens elements faces a first direction and the second array of lens elements faces a second direction that is opposite the first direction.

* * * * *